(12) United States Patent
Yasunaga

(10) Patent No.: US 10,493,802 B2
(45) Date of Patent: Dec. 3, 2019

(54) PNEUMATIC TIRE

(71) Applicant: TOYO TIRE & RUBBER CO., LTD., Osaka-shi, Osaka (JP)

(72) Inventor: Toshikazu Yasunaga, Osaka (JP)

(73) Assignee: Toyo Tire Corporation, Itami-shi (JP)

( * ) Notice: Subject to any disclaimer, the term of this patent is extended or adjusted under 35 U.S.C. 154(b) by 184 days.

(21) Appl. No.: 15/602,248

(22) Filed: May 23, 2017

(65) Prior Publication Data

US 2018/0037065 A1    Feb. 8, 2018

(30) Foreign Application Priority Data

Aug. 3, 2016    (JP) ................. 2016-152998

(51) Int. Cl.
*B60C 11/03*    (2006.01)
*B60C 11/12*    (2006.01)

(52) U.S. Cl.
CPC ...... *B60C 11/0302* (2013.01); *B60C 11/1236* (2013.01); *B60C 11/1263* (2013.01); *B60C 2011/0341* (2013.01); *B60C 2011/0358* (2013.01); *B60C 2011/0374* (2013.01); *B60C 2011/0376* (2013.01); *B60C 2011/129* (2013.01); *B60C 2011/1213* (2013.01)

(58) Field of Classification Search
CPC ............. B60C 11/0302; B60C 11/1263; B60C 11/1236; B60C 2011/0376; B60C 2011/1213; B60C 2011/129; B60C 2011/0358; B60C 2011/0374; B60C 2011/0341
USPC ................ D12/549, 550, 555, 556, 564, 565
See application file for complete search history.

(56) References Cited

U.S. PATENT DOCUMENTS

| | | | | |
|---|---|---|---|---|
| D613,675 S | * | 4/2010 | Perrin | D12/553 |
| D719,083 S | * | 12/2014 | Hayashi | D12/555 |
| D733,640 S | * | 7/2015 | Huang | D12/564 |
| D741,250 S | * | 10/2015 | Nakamura | D12/565 |

FOREIGN PATENT DOCUMENTS

| | | |
|---|---|---|
| JP | 2002-87023 A | 3/2002 |
| JP | 2014-181000 A | 9/2014 |

* cited by examiner

*Primary Examiner* — Steven D Maki
*Assistant Examiner* — Philip N Schwartz
(74) *Attorney, Agent, or Firm* — Westerman, Hattori, Daniels & Adrian, LLP

(57) ABSTRACT

A tread portion of a pneumatic tire is divided into a center region at a center portion in a tire width direction and shoulder regions disposed on both sides of the center region. Each of the center region includes ribs which are formed by a plurality of main grooves extending in a tire circumferential direction. The shoulder region includes: a plurality of inclined grooves which are inclined toward the outside in a tire width direction and toward a direction opposite to a tire rotational direction at the time of advancing a vehicle; and a shoulder block surrounded by the inclined grooves.

12 Claims, 3 Drawing Sheets

PNEUMATIC TIRE

CROSS-REFERENCE TO RELATED APPLICATIONS

This application claims priority of Japanese Patent Application No.: 2016-152998 filed on Aug. 3, 2016, the content of which is incorporated herein by reference.

BACKGROUND OF THE INVENTION

Technical Field

The present invention relates to a pneumatic tire.

Related Art

Conventionally, as a pneumatic tire, there has been known a pneumatic tire which includes a plurality of inclined main grooves extending toward the outside in a tire width direction from an area in the vicinity of a tire equator and in an inclined manner toward a side opposite to a tire rotational direction (see JP-A-2014-181000, for example).

As another pneumatic tire, there has been known a pneumatic tire where lateral grooves which communicate with main grooves and extend in an inclined manner in directions opposite to each other toward outside in a tire width direction, and bent sub grooves which do not communicate with the main grooves, intersect with one of lateral grooves disposed adjacently to the main groove on a side opposite to a tire rotational direction, and extend to a tire ground contact end on the outside in the tire width direction are alternately arranged at predetermined pitches (see JP-A-2002-87023, for example).

However, in the above-mentioned both pneumatic tires, a warm-up performance for elevating a temperature of a tread portion earlier in a traveling start stage has not been taken into consideration. Further, a steering stability when a warm-up performance is enhanced has not been also taken into consideration in these pneumatic tires.

SUMMARY

It is an object of the present invention to provide a pneumatic tire which can enhance both a warm-up performance and a steering stability.

According to an aspect of the present invention, as a means to overcome such drawbacks, there is provided a pneumatic tire where a tread portion is divided into a center region disposed at a center portion in a tire width direction and shoulder regions disposed on both sides of the center region, the center region includes ribs which are formed by a plurality of main grooves extending in a tire circumferential direction, and the shoulder region includes: a plurality of inclined grooves which are inclined toward the outside in a tire width direction and toward a direction opposite to a tire rotational direction at the time of advancing a vehicle; and a shoulder block surrounded by the inclined grooves.

With such a configuration, when the tread portion is brought into contact with a ground, the shoulder block is easily deformable in the shoulder region and hence, the generation of heat is promoted in the shoulder region whereby a warm-up performance can be enhanced. On the other hand, the ribs are formed in the center region and hence, the tread portion can maintain desired rigidity whereby the pneumatic tire can acquire an excellent steering stability.

It is preferable that the main groove formed in the center region and the inclined grooves formed in the shoulder region be formed independently from each other.

With such a configuration, rigidity of the pneumatic tire in the shoulder region can be enhanced so that a cornering performance of the pneumatic tire can be enhanced.

It is preferable that the shoulder block be inclined toward the outside in a tire width direction and toward a direction opposite to a tire rotational direction from a center region side.

With such a configuration, heat generated in the shoulder block can be easily transferred to the center region side or to the outside of the shoulder region in the tire width direction and hence, the generation of heat over the entire tread portion can be made uniform and effective.

It is preferable that, among the inclined grooves which divide the shoulder block, the inclined groove positioned on at least either one of the innermost side or the outermost side in the tire width direction have a narrower width than other inclined grooves.

With such a configuration, the deformation of the shoulder block which is brought about when the shoulder block is brought into contact with a ground at a corner portion inside or outside in the tire width direction is supported by a land portion disposed adjacently to the shoulder block and hence, lowering of rigidity of the shoulder block can be suppressed.

According to the present invention, with the formation of the shoulder block in the shoulder region, the tread portion is easily deformable at the time of contacting a ground and hence, a temperature of the tread portion can be easily elevated earlier whereby a warm-up performance of the pneumatic tire can be enhanced. Further, with the formation of the rib in the center region, rigidity of the pneumatic tire at the time of contacting the ground can be maintained whereby steering stability of the pneumatic tire can be enhanced.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment of the present invention is described with reference to attached drawings. In the description made hereinafter, terms indicative of specific directions and positions (for example, terms including "up", "down", "side", and "end") are used when necessary. However, these terms are used for merely facilitating understanding of the invention with reference to drawings, and the technical scope of the present invention is not limited by meaning of these terms. Further, the description made hereinafter merely shows an example essentially, and does not intend to limit the present invention, products to which the present invention is applied, or its applications. Further, drawings are schematically shown and hence, ratios of respective sizes and the like may differ from actual ratios of sizes and the like.

Figure 1:
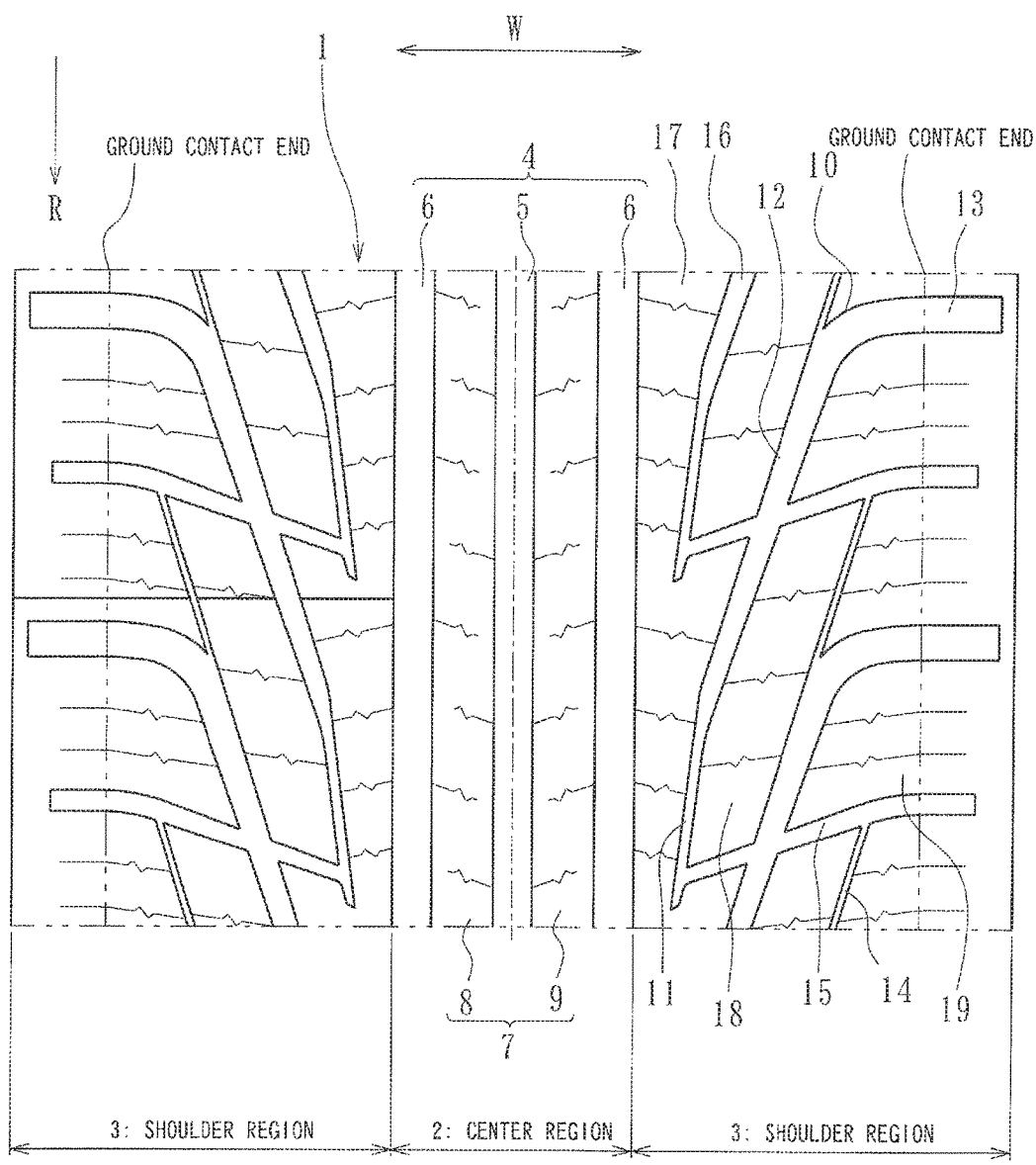
FIG. 1 is a developed view showing a portion of a tread portion of a tire according to an embodiment of the present invention.

FIG. 1 is a developed view showing a portion of a tread portion 1 of a pneumatic tire according to the embodiment of the present invention. Although not shown in the drawing, the pneumatic tire is configured such that a carcass is extended between a pair of bead cores, an intermediate portion of the carcass is reinforced by a belt wound around an outer peripheral side of the intermediate portion of the carcass, and the pneumatic tire has the tread portion 1 outside the carcass in the tire radial direction.

The tread portion 1 is divided into a center region 2 which is positioned at a center portion in a tire width direction (indicated by an arrow W in FIG. 1), and shoulder regions 3 which are respectively positioned on both sides of the center region 2. In this embodiment, as a material for forming the tread portion 1, a rubber material having JIS-A hardness of 40 to 70 at 20° C. is used. This rubber material is a material used for a racing wet tire and an intermediate tire. Sizes of respective grooves descried hereinafter are values when the pneumatic tire is a racing intermediate tire.

In the center region 2, center ribs 7 (a first rib 8 on a left side and a second rib 9 on a right side in FIG. 1) are formed in two rows by three main grooves 4 (a center main groove 5 and side main grooves 6 on both sides of the center main groove 5) extending in a tire circumferential direction (in FIG. 1, in a vertical direction). In this embodiment, with respect to the center main groove 5, a depth is set to 4.0 mm, an opening width is set to 12.4 mm, and an inclination angle of a side surface with respect to a vertical plane is set to 25°. Further, with respect to the side main grooves 6, a depth is set to 5.0 mm, an opening width is set to 12 mm, and an inclination angle of a side surface with respect to a vertical plane is set to 25°.

Figure 2:
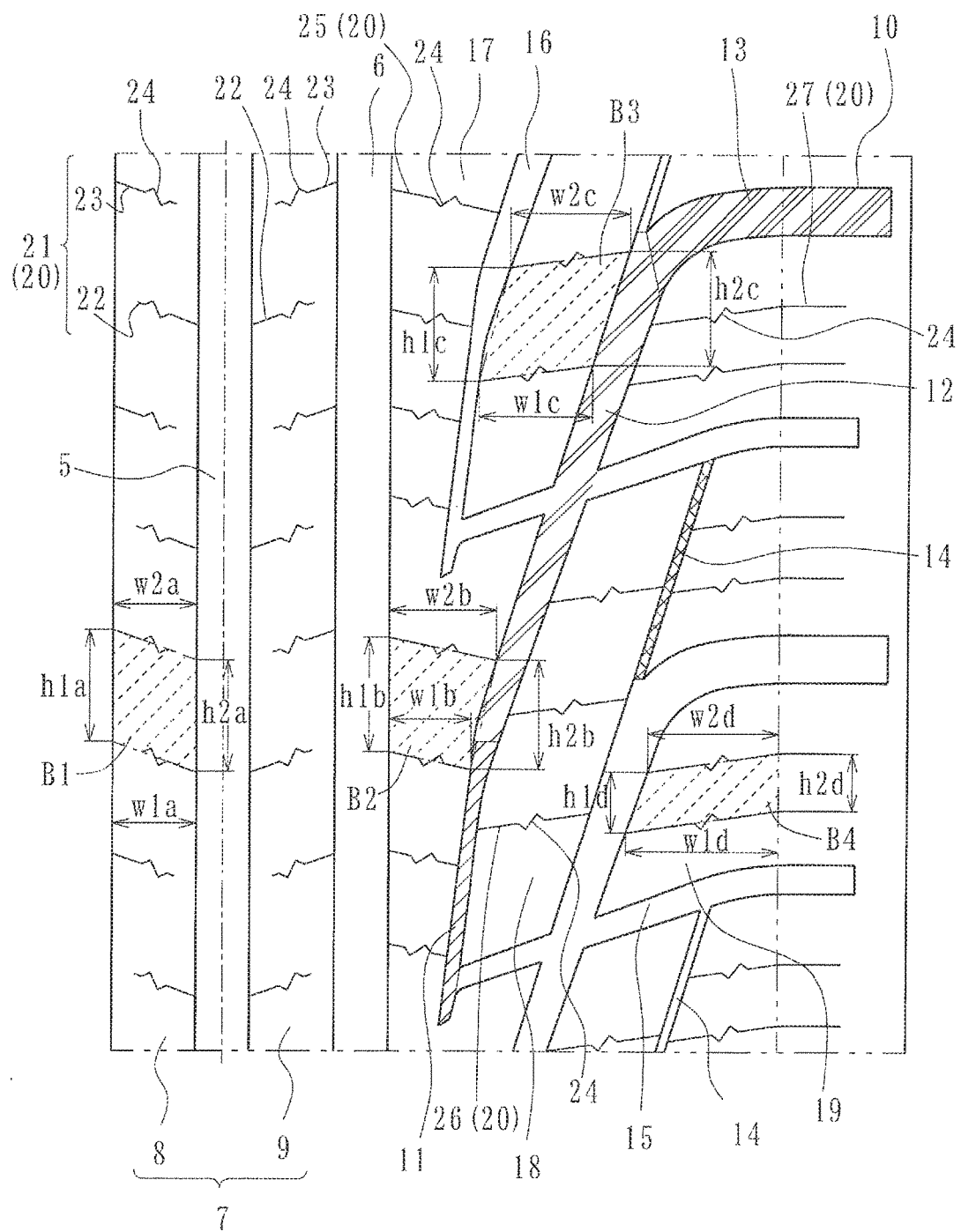
FIG. 2 is a partially enlarged view of FIG. 1.

In each shoulder region 3, main lateral grooves 10 each of which is inclined toward the outside in a tire width direction toward a direction opposite to a tire rotational direction (indicated by an arrow R in FIG. 1) are formed. As shown in FIG. 2, the main lateral groove 10 includes: a first inclined groove portion 11 (indicated by hatching in FIG. 2); a second inclined groove portion 12 (indicated by double-line hatching in FIG. 2); a first lateral groove portion 13 (indicated by triple-line hatching in FIG. 2); and a second lateral groove portion 14 (indicate by cross-hatching in FIG. 2). The first inclined groove portion 11 extends in the tire circumferential direction while gradually being away from the side main groove 6. The second inclined groove portion 12 which is formed continuously with the first inclined groove portion 11 has a width gradually increased from the first inclined groove portion 11, and has a larger inclination angle with respect to the tire circumferential direction than that of the first inclined groove portion 11 so as to be further away from the side main groove 6. From a terminal end portion of the second inclined groove portion 12, the first lateral groove portion 13 which is largely curved and has larger width than that of the second inclined groove portion 12 extends toward the outside in the tire width direction beyond a ground contact end which is one of both side ends of a ground contact surface. The second lateral groove portion 14 further extends obliquely from the terminal end portion of the second inclined groove portion 12 with a narrower width than that of the first inclined groove portion 11. The main lateral grooves 10 are disposed at fixed intervals in the tire circumferential direction. The main lateral grooves 10 disposed adjacently to each other in the tire circumferential direction are disposed such that the first inclined groove portion 11 and a front half portion of the second inclined groove portion 12 of one main lateral groove 10 and a rear half portion of the second inclined groove portion 12 and the second lateral groove portion 14 of another main lateral groove 10 overlap with each other as viewed in the tire width direction. In this embodiment, with respect to the first inclined groove portion 11, a depth is set to 2.5 mm, an opening width is set to 3.2 mm, and an inclination angle of a side surface with respect to a vertical plane is set to 10°. With respect to the second inclined groove portion 12, a depth is set to 5.0 mm, an opening width is set to a value which falls within a range of from 6.3 to 9.6 mm, and an inclination angle of a side surface with respect to a vertical plane is set to 20°. With respect to the first lateral groove portion 13, a depth is set to 4.0 mm, an opening width is set to 10.9 mm, and an inclination angle of a side surface with respect to a vertical plane is set to 20°. Further, with respect to the second lateral groove portion 14, a depth is set to 2.5 mm, an opening width is set to 2.0 mm, and an inclination angle of a side surface with respect to a vertical plane is set to 0°.

As described above, the main lateral grooves 10 extend obliquely toward the outside in a tire width direction toward a direction opposite to a tire rotational direction from an area in the vicinity of the side main groove 6. Accordingly, when a vehicle travels on a wet road surface, water which intrudes into the main lateral grooves 10 flows smoothly. Further, the main lateral grooves 10 extend beyond the ground contact end and hence, the main lateral grooves 10 can exhibit an excellent water drainage function.

A sub lateral groove 15 extends toward the outside in the tire width direction from one end side (side main groove side) of the first inclined groove portion 11. The sub lateral grooves 15 are disposed at fixed intervals in the tire circumferential direction. The sub lateral groove 15 intersects with the second inclined groove portion 12 of another main lateral groove 10 disposed adjacently to the sub lateral groove 15 in the tire circumferential direction, merges with the second lateral groove 14 of still another main lateral groove 10 and, thereafter, extends toward the outside in the tire width direction beyond the ground contact end. The sub lateral groove 15 projects toward the outside in the tire width direction from the ground contact end with a smaller projection size than a projection size of the main lateral groove 10 and with a smaller width size than a width size of the main lateral groove 10.

An auxiliary main groove 16 which continuously extends in a zigzag shape in the tire circumferential direction is formed of the first inclined groove portion 11 and the second inclined groove portion 12 of the main lateral groove 10 and a portion of the sub lateral groove 15. The main grooves 4 in the center region 2 and the lateral grooves in the shoulder regions 3 do not intersect with each other, and shoulder ribs 17 which extend continuously in the tire circumferential direction are formed by the side main grooves 6 and the auxiliary main grooves 16. With such a configuration, rigidity of the center region 2 and rigidity of portions in the shoulder regions 3 along the center region 2 are enhanced.

The first inclined groove portion 11 and the front half portion of the second inclined groove portion 12 of one of the main lateral grooves 10 disposed adjacently to each other in the tire circumferential direction, a rear half portion of the second inclined groove portion 12 and the second lateral groove portion 14 of another main lateral grooves 10, and the pair of sub lateral grooves 15 disposed adjacently to each other in the tire circumferential direction respectively form an inclined groove. A first shoulder block 18 is defined by such inclined grooves. Accordingly, the first shoulder block 18 is inclined toward the outside in the tire width direction as the shoulder block 18 extends toward the tire circumferential direction (in a direction opposite to the tire rotational direction R).

A second shoulder block 19 is formed by the rear half portion of the second inclined groove portion 12 of the main lateral groove 10, the first lateral groove portion 13, and the sub lateral groove 15. As viewed from the tire width direction, two second shoulder blocks 19 are formed corresponding to one first shoulder block 18. That is, by dividing the shoulder block more finely toward the outside in the tire width direction, rigidity of the shoulder block is weakened so that a ground contact performance at the shoulder region 3 is enhanced.

The center rib 7, the shoulder ribs 17, the first shoulder blocks 18, and the second shoulder blocks 19 constitute land portions of the present invention. A plurality of sipes 20 are formed in these land portions respectively As shown in FIG. 2, center sipes 21 which are formed on the center rib 7 (the first rib 8 and the second rib 9) extend obliquely from each main groove 4, and are formed at predetermined intervals in the tire circumferential direction. The center sipes 21 formed on the first rib 8 are inclined in a direction opposite to the tire rotational direction (upward in FIG. 1) toward the outside in the tire width direction from a center line. In this embodiment, an inclination angle of the center sipe 21 with respect to the tire width direction is set to approximately 20°. Each sipe 21 is formed of: a first sipe 22 which has one end (first end) thereof communicated with the center main groove 5 and the other end (second end) thereof terminated in the first rib 8, and: a second sipe 23 which has one end (first end) thereof communicated with the side main groove 6 and the other end (second end) thereof terminated in the first rib 8. The first sipe 22 and the second sipe 23 are formed alternately in the tire circumferential direction.

Figure 3:
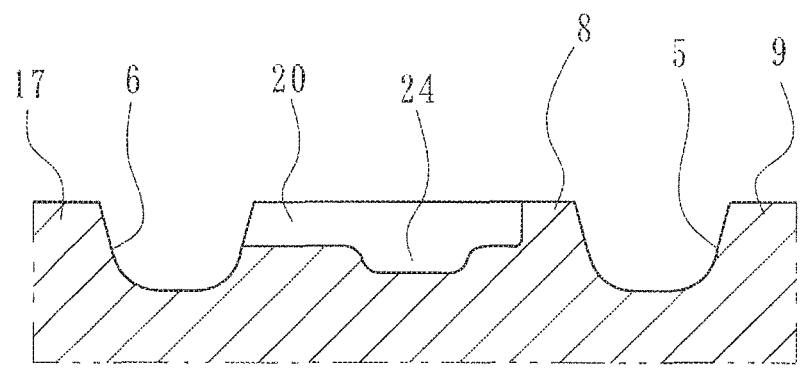
FIG. 3 is a schematic cross-sectional view of a sipe formed on a center rib shown in FIG. 1.

Each sipe 20 has a wave-shaped portion 24 on a portion thereof excluding both end portions thereof, that is, at a position slightly away from the first end and the second ends. The wave-shaped portion 24 is formed of 1 cycle of triangular projecting portions constituted of a triangular leftward projecting portion and a triangular rightward projecting portion disposed continuously and adjacently to each other and projecting in directions opposite to each other. The wave-shaped portion 24 is positioned at substantially the center portion of the center rib 7 (the first rib 8 or the second rib 9). As shown in FIG. 3, in each sipe 20, the wave-shaped portion 24 is set deeper than other portions (a cross-sectional shape of the wave-shaped portion 24 shown in a simplified manner in FIG. 3). In this embodiment, a depth of the sipe 20 at both end portions (portions where the wave-shaped portion 24 is not formed) is 60% or less of a depth of the main groove 4, the main lateral groove 10 or the sub lateral groove 15. In this embodiment, the depth of the sipe 20 at both end portions is set to 60% or less of the depth of the main groove 4, that is, is set to 3.0 mm or less. However, as in the case of respective sipes described later, the depth can be changed within a range of from 1.5 mm to 3.0 mm inclusive corresponding to a depth of the groove with which the sipe is communicated.

First shoulder sipes 25 formed on the shoulder rib 17 are formed so as to make the side main groove 6 and the auxiliary main groove 16 communicate with each other. The first shoulder sipes 25 are formed at positions corresponding to the positions of the center sipes 21 formed on the first rib 8 or the second rib 9 in the tire circumferential direction, and the inclination of the first shoulder sipes 25 in the tire width direction is set opposite to the inclination of the center sipes 21 in the tire width direction. The wave-shaped portion 24 of the first shoulder sipe 25 is substantially equal to the wave-shaped portion 24 of the center sipe 21 formed on the center rib 7. That is, the wave-shaped portion 24 of the first shoulder sipe 25 is formed at a center portion of the shoulder rib 17 in the tire width direction, and the wave-shaped portion 24 is set deeper than both end portions of the first shoulder sipe 25.

Second shoulder sipes 26 which are formed on each first shoulder block 18 are formed so as to make the first inclined groove portion 11 and the front half portion of the second inclined groove portion 12 of one main lateral groove 10 and the rear half portion of the second inclined groove portion 12 and the second lateral groove portion 14 of the other main lateral groove 10 disposed adjacently to one main lateral groove 10 communicate with each other. Three second shoulder sipes 26 are formed on each first shoulder block 18 so as to substantially equally divide the first shoulder block 18 into four sections in the tire circumferential direction. The second shoulder sipe 26 is displaced from the first shoulder sipe 25 formed on the shoulder rib 17 in the tire circumferential direction, and is positioned between the first shoulder sipes 25 disposed adjacently to each other. The second shoulder sipe 26 is inclined in a direction opposite to a direction that the first shoulder sipe 25 is inclined with respect to the tire width direction. A wave-shaped portion 24 of the second shoulder sipe 26 is substantially equal to the wave-shaped portion 24 of the center sipe 21 formed on the center rib 7 and the wave-shaped portion 24 of the first shoulder sipe 25 formed on the shoulder rib 17. The wave-shaped portion 24 of each second shoulder sipe 26 is formed at a center portion of the first shoulder block 18 in the tire width direction, and is formed deeper than both end portions of the second shoulder sipe 26.

Third shoulder sipes 27 formed on each second shoulder block 19 are formed so as to substantially equally divide the second shoulder block 19 into three sections in the tire circumferential direction, and extend in substantially the same direction as the second shoulder sipes 26. One end of the third shoulder sipe 27 is communicated with the rear half portion of the second inclined groove portion 12 of the main lateral groove 10 or the second lateral groove portion 14. The other end of the third shoulder sipe 27 extends beyond the ground contact end, and is terminated in the middle of the second shoulder block 19. A wave-shaped portion 24 of the third shoulder sipe 27 is substantially equal to the wave-shaped portion 24 of the center sipe 21 formed on the center rib 7, the wave-shaped portion 24 formed on the shoulder rib 17, or the wave-shaped portion 24 formed on the first shoulder block 18. The wave-shaped portion 24 of each third shoulder sipe 27 is formed at a center position between the rear half portion of the second inclined groove portion 12 and the ground contact end and is formed deeper than both end portions of the third shoulder sipe 27.

In each of small blocks B1 to B4 surrounded by the sipes 20 disposed adjacently to each other in the tire circumferential direction and the main grooves or the lateral grooves, a ratio (aspect ratio) h/w between a tire circumferential direction component (longitudinal direction) h and a tire width direction component (lateral direction) w is set as follows.

In the center region 2, with respect to the center sipe 21 which is terminated in the middle portion of the center rib 7, an imaginary line (indicated by a double-dashed chain line in FIG. 2) which extends to the center main groove 5 or the side main groove 6 is assumed, and a region formed of an acquired parallelogram is set as the small block B1 (indicated by dot-hatching in FIG. 2). In the small block B1, assuming tire width direction components of the center sipes 21 (including the imaginary line) as w1a, w2a, and tire circumferential direction components at boundary portions with the center main groove 5 and the side main groove 6 as h1a, h2a, an aspect ratio Ce is expressed as A/B (A=(w1a+w2a)/2, B=(h1a+h2a)/2). In this embodiment, the aspect ratio Ce is set to a value which falls within a range of from 1.2 to 1.6 inclusive. With such a setting, a traction performance (braking performance) in the fore-and-aft direction at the time of traveling on a road surface can be enhanced.

In the shoulder rib 17 in the shoulder region 3, a region surrounded by the first shoulder sipes 25 disposed adjacently to each other in the tire circumferential direction, the side main groove 6 and the auxiliary main groove 16 is set as a small block B2 (indicated by dot-hatching in FIG. 2). In the small block B2, assuming tire width direction components of the respective first shoulder sipes 25 as w1b, w2b, and tire circumferential direction components at boundary portions with the side main groove 6 and the auxiliary main groove 16 as h1b, h2b, an aspect ratio Sh1 is set as A/B (A=(w1b+w2b)/2, B=(h1b+h2b)/2). In this embodiment, the aspect ratio Sh1 in the small block 132 of the shoulder rib 17 is set to a value which falls within a range of from 1.0 to 1.2 inclusive. However, it is preferable to set the aspect ratio Sh1 in the shoulder rib 17 to a value closer to 1.0 from a viewpoint that the shoulder rib 17 can be deformed uniformly in both the tire circumferential direction and the tire width direction.

In the first shoulder block 18 in the shoulder region 3, a region surrounded by the second shoulder sipes 26 disposed adjacently to each other in the tire circumferential direction, and the sub lateral grooves 15 on both sides in the tire circumferential direction is set as a small block B3 (indicated by clot-hatching in FIG. 2). In the small block B3, assuming tire width direction components of the respective second shoulder sipes 26 as w1c, w2c and tire circumferential direction components at boundary portions of the main lateral groove 10 (the first inclined groove portion 11 and the front half portion of the second inclined groove portion 12) and the main lateral groove 10 (the rear half portion of the second inclined groove portion 12 and the second lateral groove portion 14) as h1c, h2c, an aspect ratio Sh2 is set as A/B (A=(w1c+w2c)/2, B=(h1c+h2c)/2). In this embodiment, the aspect ratio Sh2 in the first shoulder block 18 is set to a value which falls within a range of from 0.8 to 1.0 inclusive. With such a setting, rigidity of the first shoulder block 18 in the tire width direction can be enhanced thus enhancing cornering performance of the pneumatic tire.

In the second shoulder block 19 in the shoulder region 3, a region surrounded by the third shoulder sipes 27 disposed adjacently to each other in the tire circumferential direction, the main lateral groove 10 (the rear half portion of the second inclined groove portion 12) or the second lateral groove portion 14, and the ground contact end is set as a small block B4 (indicated by dot-hatching in FIG. 2). In the small block B4, assuming tire width direction components of the respective third shoulder sipes 27 as w1d, w2d, and tire circumferential direction components at boundary portions between the rear half portion of the second inclined groove portion 12 or the second lateral groove portion 14 and the ground contact end as h1d, h2d, an aspect ratio Sh3 is set to A/B (A=(w1d+w2d)/2, B=(h1d+h2d)/2). In this embodiment, the aspect ratio Sh3 in the second shoulder block 19 is set to a value which falls within a range of from 0.4 to 0.8 inclusive. With such a setting, rigidity of the second shoulder block 19 in the tire width direction can be enhanced thus enhancing cornering performance of the pneumatic tire.

It is necessary to satisfy a relationship of Ce>Sh1>Sh2>Sh3 among the respective aspect ratios Ce, Sh1, Sh2 and Sh3.

As described above, according to the tire where the plurality of sipes 20 each of which has at least one end side thereof communicated with the main groove 4 or the main lateral groove 10 (sub lateral groove 15) are formed on the land portion, the tire is easily deformed at the time of traveling on a road surface so that heat is easily generated in the tire immediately after the tire starts traveling. That is, a warm-up performance of the tire can be enhanced. Further, the tire is a racing tire and hence, steering stability is also enhanced due to generation of heat.

Since rigidity of the land portion is enhanced by the formation of the wave-shaped portions 24, there is no possibility that the steering stability is impaired although the sipes 20 are formed.

An edge length at the time of ground contacting can be increased due to the formation of the wave-shaped portions 24 and hence, a contact amount with a road surface is increased whereby heat can be easily radiated. Accordingly, there is no possibility that a temperature is elevated greater than necessary after warm-up is finished. Further, a water membrane is easily cut at the center portion of the land portion and hence, a wet performance can be enhanced.

The sipe 20 is formed such that a depth of the center portion is set larger than a depth of other portions and hence, a ground contact pressure distribution at the land portion can be made uniform thus enabling the uniform heat generation of the tire.

Particularly, in the center region 2, the sipe 20 is formed such that only one end of the sipe 20 is communicated with the main groove 4 and the other end of the sipe 20 is terminated in the center rib 7 and, further, the wave-shaped portion 24 is also formed on a terminal position side and hence, rigidity of the center rib 7 can be maintained. Further, the sines 20 formed on the ribs disposed adjacently to each other are inclined in the directions opposite to each other and hence, the occurrence of non-uniform deformation can be prevented.

Further, the first shoulder block 18 has the independent structure by being surrounded by the inclined grooves. Accordingly, the shoulder block 18 is easily deformed at the time of contacting a road surface. Accordingly, the shoulder block 18 possessed excellent heat generation property thus exhibiting favorable warm-up performance.

The present invention is not limited to the configuration described in the above-mentioned embodiment, and various modifications are conceivable.

In the above-mentioned embodiment, the wave-shaped portion 24 formed in the sipe 20 is formed of 1 cycle of triangular projecting portions constituted of a triangular leftward projecting portion and a triangular rightward projecting portion disposed continuously and adjacently to each other and projecting in directions opposite to each other. However, the wave shape is not limited to a triangular shape, and various shapes such as a sinusoidal wave shape, a rectangular wave shape can be adopted. Further, the number of cycles is not limited to 1 cycle, and the number of cycles may be 0.5 cycles 1.5 cycles or 2 cycles. However, by setting the number of cycles of the wave-shaped portions to 2 cycles or less, a length of a deep portion of the sipe can be restricted and hence, it is possible to prevent the excessive lowering of rigidity whereby the land portion can maintain desirable rigidity.

What is claimed is:

1. A pneumatic tire where a tread portion is divided into a center region disposed at a center portion in a tire width direction and shoulder regions disposed on both sides of the center region,
the center region includes ribs which are formed by a plurality of main grooves extending in a tire circumferential direction, and
the shoulder region includes: a plurality of inclined grooves which are inclined toward the outside in a tire width direction and toward a direction opposite to a tire rotational direction at the time of advancing a vehicle; and a shoulder block surrounded by the inclined grooves; wherein each of the inclined grooves comprise a first inclined groove portion, a second inclined groove portion; a first lateral groove portion and a second lateral groove portion;
wherein the first inclined groove portion extends in the tire circumferential direction and extends in a gradual direction away from the main grooves;
wherein the second inclined groove portion is formed continuously from the first inclined groove portion, has a width that gradually increases and is greater than the width of the first inclined groove portion, has an inclination angle with respect to the tire circumferential direction that is larger than the inclination angle with respect to the tire circumferential direction of the first inclined groove portion; and the second inclined groove portion is further away from the main groove than the first inclined groove portion in the tire width direction;
wherein the first lateral groove portion is formed at a terminal end portion of the second inclined groove portion, is curved shape, has a larger width than the width of the second inclined groove portion, and extends towards the outside in the tire width direction beyond a ground contact end; and
wherein the second lateral groove portion extends obliquely from the terminal end portion of the second inclined groove portion and the second lateral groove portion has a narrower width than the width of the first inclined groove portion.

2. The pneumatic tire according to claim 1, wherein the main groove formed in the center region and the inclined grooves formed in the shoulder region are formed independently from each other.

3. The pneumatic tire according to claim 1, wherein the shoulder block is inclined toward the outside in a tire width direction and toward a direction opposite to a tire rotational direction from a center region side.

4. The pneumatic tire according to claim 2, wherein the shoulder block is inclined toward the outside in a tire width direction and toward a direction opposite to a tire rotational direction from a center region side.

5. The pneumatic tire according to claim 1, wherein among the inclined grooves which divide the shoulder block, the inclined groove positioned on at least either one of the innermost side or the outermost side in the tire width direction has a narrower width than other inclined grooves.

6. The pneumatic tire according to claim 2, wherein among the inclined grooves which divide the shoulder block, the inclined groove positioned on at least either one of the innermost side or the outermost side in the tire width direction has a narrower width than other inclined grooves.

7. The pneumatic tire according to claim 3, wherein among the inclined grooves which divide the shoulder block, the inclined groove positioned on at least either one of the innermost side or the outermost side in the tire width direction has a narrower width than other inclined grooves.

8. The pneumatic tire according to claim 4, wherein among the inclined grooves which divide the shoulder block, the inclined groove positioned on at least either one of the innermost side or the outermost side in the tire width direction has a narrower width than other inclined grooves.

9. The pneumatic tire according to claim 1, wherein the first inclined groove portion and a front half portion of the second inclined groove portion of the plurality of inclined grooves overlaps a rear half portion of the second inclined groove portion and the second lateral groove portion of an adjacent inclined groove of the plurality of inclined grooves, as viewed in the tire width direction.

10. The pneumatic tire according to claim 1, wherein the first inclined groove portion has a depth of 2.5 mm, an opening width of 3.2 mm, and an inclination angle of a side surface with respect to a vertical plane of at 10°;
wherein the second inclined groove portion has a depth of 5.0 mm, an opening width of 6.3 to 9.6 mm, and an inclination angle of a side surface with respect to a vertical plane of at 20°;
wherein the first lateral groove portion has a depth of 4.0 mm, an opening width of 10.9 mm, and an inclination angle of a side surface with respect to a vertical plane of at 20°; and
wherein the second lateral groove portion has a depth of 4.0 mm, an opening width of 10.9 mm, and an inclination angle of a side surface with respect to a vertical plane of at 20°.

11. The pneumatic tire according to claim 1, wherein the inclined grooves
further comprise a sub lateral groove,
wherein the sub lateral groove extends towards the outside in a tire width direction from one end side of the first inclined groove portion of the plurality of inclined grooves and intersects with the second inclined groove portion of an adjacent inclined groove of the plurality of inclined grooves, and merges with the second lateral groove of a next adjacent inclined groove of the plurality of inclined grooves, and extends towards the outside in the tire width direct beyond the ground contact end.

12. The pneumatic tire according to claim 1, wherein a plurality of sipes are formed in each of the ribs and shoulder block.

* * * * *